Oct. 21, 1941.  P. VAN SITTERT  2,259,839
CLUTCH
Filed April 20, 1939
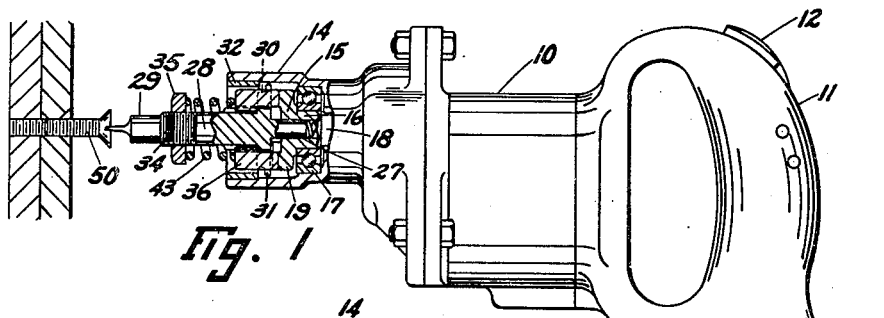
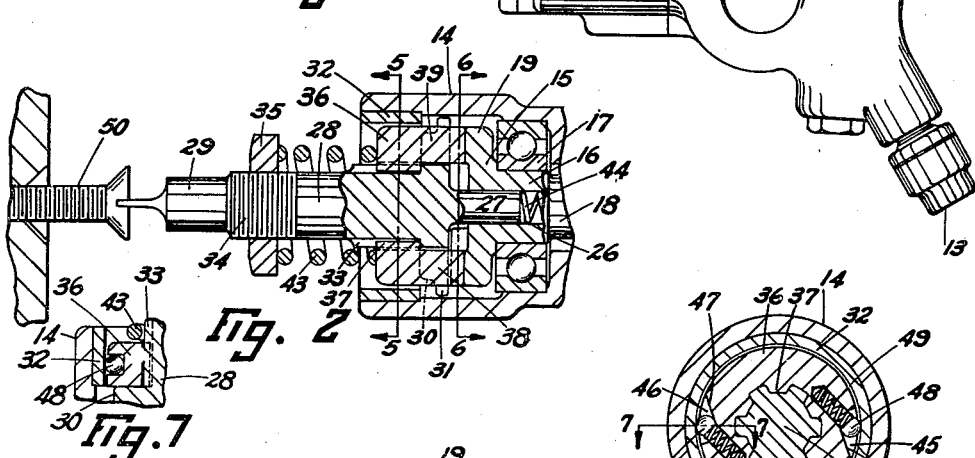
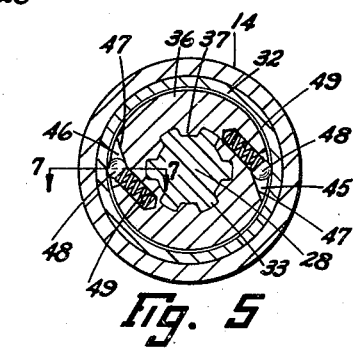
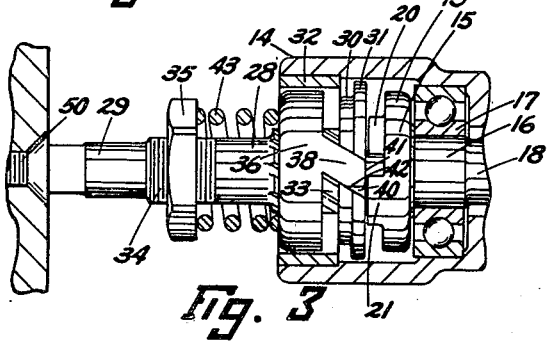
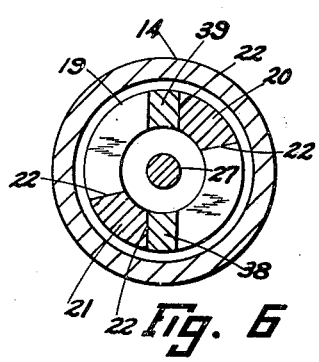
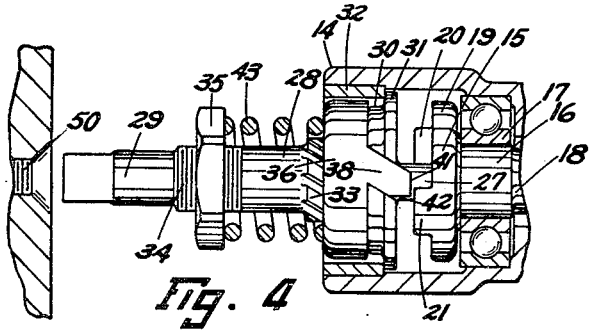
INVENTOR
PAUL VAN SITTERT
BY
ATTORNEY Patented Oct. 21, 1941

2,259,839

UNITED STATES PATENT OFFICE 2,259,839

CLUTCH

Paul Van Sittert, Cleveland Heights, Ohio, assignor to The Cleveland Pneumatic Tool Company, Cleveland, Ohio, a corporation of Ohio Application April 20, 1939, Serial No. 268,962

4 Claims. (Cl. 192—30.5)

This invention relates to clutches generally, but more specifically to a clutch mechanism particularly adapted for use in portable tools such as screw drivers, nut setters or the like.

Heretofore, such portable tools were equipped with a clutch mechanism including clutch members which under certain conditions of operation were automatically engageable and releasable for transmitting a rapid succession of rotative impacts to the work being rotated, thus resulting not only in the premature wear of the clutch members, but also in a succession of jars or oscillation transmitted to the tool and consequently to the hand of the operator.

It is therefore one object of this invention to produce an improved clutch mechanism arranged and constructed in a manner enabling the clutch to be automatically released when the driven member encounters a predetermined torque resistance, but enabling the operator to control its subsequent reengagement irrespective of the continuous operation of the tool.

Another object of this invention is to provide a clutch mechanism including driving and driven clutch members with brake means automatically operable for maintaining the clutch members in inoperative position immediately after their release.

Another object of this invention is to produce an improved clutch mechanism forming a compact assembly which is strong, durable and efficient.

Other objects and advantages more or less ancillary to the foregoing reside in the specific construction and aggroupment of the elements peculiar to this structure, as will become apparent from a more complete examination of this specification.

In the drawing:

Fig. 1 is a side view partly in section of a portable tool embodying the invention.

Fig. 2 is an enlarged sectional view of the front end of the tool shown in Fig. 1.

Figs. 3 and 4 are views similar to Fig. 2 illustrating movable parts in different positions.

Fig. 5 is a cross sectional view taken in a plane indicated by line 5—5 in Fig. 2.

Fig. 6 is a cross sectional view taken in a plane indicated by line 6—6 in Fig. 2.

Fig. 7 is a longitudinal sectional view taken in a plane indicated by line 7—7 in Fig. 5.

Referring to the drawing, 10 represents a fluid actuated rotary motor having secured thereto a handle 11 equipped with a throttle valve handle 12 and provided with an inlet connection 13. To the motor 10 is also secured a front housing 14 within which is mounted the clutch mechanism forming the basis of this invention.

The motor 10 may be of any suitable type operable for transmitting rotation in one direction to a driving clutch member generally designated by 15 and including a shank 16 journaled within a ball bearing 17 and preferably forming an integral part of a motor shaft or driving spindle 18. The front end of the driving clutch member 15 is enlarged to form an annular flange 19 having depending therefrom two diametrically opposed clutch jaws 20 and 21 each formed with two straight side surfaces 22. Within the clutch member 15 there is also provided a central bore 26 having journaled therein the reduced end 27 of a driven spindle 28, which spindle protrudes beyond the free end of the casing 14 to detachably receive a tool implement of any suitable type, represented on the drawing by a screw driver 29 mounted in the driven spindle for rotation therewith. Below the driving clutch member 15, the driven spindle 28 is provided with an integral collar 30 formed with an annular flange 31 capable of engagement with the inner end of a stationary bushing 32 pressed within the front housing 14. Below the collar 30, the driven spindle 28 is provided with relatively short helical splines 33, and below the splines with a screw threaded portion 34 on which is mounted a nut 35. Mounted on the splines 33, there is an annular driven clutch member 36 formed with internal helical splines 37 meshing with the splines 33 and capable of axial movement relative thereto. The driven clutch member 36 is provided with two diametrically opposed jaws 38 and 39 extending upwardly therefrom in inclined relation with the center axis of the driven spindle 28, and substantially parallel to the splines 33 and 37. The jaws 38 and 39 are free to slide through corresponding inclined slots 40 provided through the collar 30 and the flange 31 of the driven spindle 28. Each jaw 38 and 39 is provided with a flat end wall 41 engageable with the corresponding end wall of the driving clutch member 15 between the jaws 20 and 21 for limiting upward movement of the driven clutch member 36 relative to the driven spindle 28, and with a straight side wall 42 engageable by the corresponding side walls 22 of the clutch jaws 20 and 21. Interposed between the driven clutch member 36 and the nut 35, there is a compression spring 43, the compression of which may be adjusted by the nut 35 on the spindle 28. Also interposed between the reduced end of the driven spindle 28 and the bottom of the bore 28, there is a small compression spring 44.

Cut within the peripheral wall of the driven clutch member 36, there are two diametrically opposed notches 45 and 46 each formed with an inclined wall 47 and accommodating a ball 48 urged into engagement with the internal wall of the bushing 32 by a compression spring 49.

If desired, the notches 45 may be made long enough to accommodate rollers or their equivalent to provide a friction brake between the clutch member 36 and the stationary bushing 32 as will be explained later.

In the operation of the device, let it be assumed that rotation in a counterclockwise direction in Fig. 6 is imparted to the driving clutch member 15 by the motor 10 through the driving spindle 18, and that the driven clutch member 36 is in operative engagement with the driven clutch member as shown in Figs. 1 and 2. In this instance, the clutch jaws 20 and 21 of the driving clutch member engaging the clutch jaws 38 and 39 of the driven clutch member will transmit rotation to the latter, which rotation would normally, due to the operative engagement of the splines 33 and 37 together with the position of the clutch jaws 38 and 39 within the inclined slots 40 of the collar 30, cause forward axial movement of the driven clutch member 36 on the driven spindle 28. However, due to the effort of the compression spring 43 on the driven clutch member 36, this clutch member is maintained in operative engagement with the driving clutch member 15 for transmitting rotation to the driven spindle 28 and consequently to the tool implement 29. When the work, represented in the drawing by the screw 50, is finally driven home, that is, when the tool implement 29 and consequently the driven spindle 28 encounters a predetermined torque resistance, the driven spindle 28 will remain stationary while the clutch member 36 driven by the driving member 15 will rotate relative to the spindle 28. Due to the operative engagement of the splines 33 and 37 and of the jaws 38 and 39 within the inclined slots 40, this rotation of the driven clutch member 36 relative to the driven spindle 28 will result in the forward axial movement of the member 36 and in the consequential compression or deflection of the spring 43. This forward axial movement of the driven clutch member will continue until its jaws 38 and 39 have moved out of engagement with the jaws 20 and 21 of the driving clutch member, thereafter enabling the driving clutch member 15 and consequently the motor 10 to rotate freely without being subjected to any appreciable load.

During the rotation of the driven member 36 in a clockwise direction in Fig. 5, the spring loaded balls 48 will simply ride over the inner wall of the bushing 32 without interference. After the predetermined torque resistance previously applied to the driven spindle 28 has been removed either by the automatic disengagement of the clutch in the manner above mentioned, or by the removal of the tool implement 29 from the work, the reverse rotation of the driven clutch member 36 which would normally take place due to the action of the compression spring 43 on the clutch member 36, is prevented by the brake including the spring loaded balls 48. In other words, rotation in a counter-clockwise direction of the clutch member 36 will cause the inclined walls 47 of the notches 45 to jam the balls 48 between the clutch member and the stationary bushing 32 to prevent reverse rotation of the clutch member, thereby causing the latter to remain stationary. Immediately after the removal of the pressure normally applied by the operator on the handle 11 to maintain the tool implement in engagement with the work, the spring 43 active on the nut 35 together with the spring 44 active on the reduced end 27 of the spindle 28, will effect forward axial movement of the driven spindle 28 relative to the clutch member 36, which forward movement is limited by the engagement of the annular flange 31 of the collar 30 with the inner end of the stationary bushing 32. In this new position shown in Fig. 4 of the driven spindle 28, the clutch is still in released condition, thereby enabling rotation of the driving clutch member 15 independently of the tool implement 29.

With the motor still running, the operator may now position the tool implement 29 for operative engagement with the work, and thereafter exert manual pressure on the handle 11 for effecting forward axial movement of the motor relative to the driven spindle 28. In this instance, the bushing 32 within the front housing 14 will slide axially relative to the brake or balls 48 from the position in Fig. 3 to the position in Fig. 2, thereby causing the reengagement of the clutch members 15 and 36 for again transmitting rotation to the driven spindle 28.

From the foregoing description, it will be understood that the present clutch mechanism is automatically releasable by virtue of a predetermined load or resistance to rotation of the tool implement 29 or spindle 28, the degree of torque resistance necessary to cause the disengagement of the clutch being controllable by varying the tension of the spring 43 through the adjusting nut 35. After release of the clutch, the brake mechanism clearly shown in Fig. 5 will maintain the clutch in released position irrespective of the actuation of the motor 10, and will enable the operator to apply the tool to the work without necessitating the motor to be shut off. Because of the locking feature incorporated in the present construction, successive rotative impacts of the tool are prevented, thus relieving the handle 11 and consequently the operator from jars or oscillation heretofore existing in tools of this type.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a device of the character described, an elongated housing, a driving and a driven spindle coaxially mounted within said housing, rotation transmitting clutch means betwen said spindles including a clutch member on said driven spindle capable of movement relative thereto in one direction for effecting the release of said clutch means, connecting means between said clutch member and driven spindle normally transmitting rotation therebetween but enabling said relative movement in said one direction when said driven spindle is subjected to a predetermined resistance to rotation, and brake means carried by said clutch member including spring pressed elements frictionally engaging said housing for preventing said relative movement in the other direction and the consequential reengagement of said clutch means.

2. In a device of the character described, an elongated housing, a driving and a driven spindle within said housing, said driven spindle being capable of limited axial movement within said housing, rotation transmitting clutch means between said spindles including a clutch member on said driven spindle capable of movement relative thereto in one direction for effecting the release of said clutch means, connecting means between said clutch member and driven spindle normally transmitting rotation therebetween but enabling said relative movement in said one direction when said driven spindle is subjected to a predetermined resistance to rotation, and brake means carried by said clutch member including spring pressed elements frictionally engaging said housing for preventing movement in the other direction of said clutch member relative to said driven spindle, said connecting means being effective for transmitting axial movement in one direction of said driven spindle to said clutch member for causing reengagement of said clutch means.

3. In a device of the character described, a housing, a driving and a driven spindle within said housing, a rotation transmitting clutch between said spindles capable of release to enable relative rotation therebetween, spring means active on said driven spindle normally maintaining said clutch in released position but capable of deflection to enable axial movement of said driven spindle into clutch operative position, said clutch including a clutch member on said driven spindle, connecting means between said clutch member and driven spindle enabling movement of the former into clutch released position, a compression spring normally preventing said last movement but capable of deflection to enable said movement, and means including brake elements carried by said clutch member frictionally engaging said housing for preventing return movement of said member by said compression spring into clutch operative engagement, said connecting means being effective for transmitting the axial movement of said driven spindle into clutch operative position to said clutch member.

4. In a device of the character described, a housing, a driving spindle within said housing, a driven spindle protruding from one end of said housing axially movable relative to said driving spindle, a rotation transmitting clutch between said spindles including a clutch member on said driven spindle movable into clutch operative engagement upon axial movement of said driven spindle in one direction, connecting means between said clutch member and driven spindle enabling rotation of the clutch member into inoperative position, and means preventing return rotation of said clutch member into operative position including spring pressed elements carried by said clutch member frictionally engaging said housing.

PAUL VAN SITTERT.